United States Patent [11] 3,615,653

[72] Inventors Elmer H. Fults
    219 Woodward Ave.;
    George E. Sanko, 3734 W. Feemster Ave.,
    both of Visalia, Calif. 93277
[21] Appl. No. 860,799
[22] Filed Sept. 24, 1969
[45] Patented Oct. 26, 1971
    Continuation-in-part of application Ser. No.
    588,329, Oct. 21, 1966, now abandoned.

[54] TREATING GRAINS AND THE LIKE WITH ACIDIC SOLUTION OF LIGNOSULFONATE
    21 Claims, No Drawings
[52] U.S. Cl. .................................................. 99/8,
    99/2, 99/80
[51] Int. Cl. ........................................... A23k 1/00,
    A23k 3/00, A23l 1/10
[50] Field of Search ........................................... 99/2, 8, 8 E,
    150, 153, 80, 83; 252/384, 315, 317; 127/70, 71

[56] References Cited
    UNITED STATES PATENTS
2,054,026  9/1936  Steindorff et al. ............  99/8
2,418,311  4/1947  McFarlane et al. ............  99/2
2,905,558  9/1959  Adams ..........................  99/2
3,336,137  8/1967  Hickey ..........................  99/2

OTHER REFERENCES
Schwartz et al., Surface Active Agents Vol. 1 Interscience Inc. P 495– 6, 1949

Primary Examiner—Norman Yudkoff
Assistant Examiner—Hiram H. Bernstein
Attorney—Huebner and Worrel ABSTRACT: A method of treating grains, seeds, and the like to improve the chemical and physical characteristics thereof by applying thereto acidic aqueous solutions containing lignosulfonate and a wetting agent for breaking down the relatively hard waxy coating from the grains which provides accelerated penetration of the solution into the endosperm thereof for improved starch gelatinization and nutrient utilization which permits feeding of such treated grains to animals without further chemical or mechanical processing. The method of the present invention is further employed as a pretreatment for whole grains which are further processed for consumption by either humans or animals whereby the above treated grains are rendered more ductile and malleable to facilitate such subsequent mechanical processes including rolling, cracking, grinding, popping and the like.

TREATING GRAINS AND THE LIKE WITH ACIDIC SOLUTION OF LIGNOSULFONATE

CROSS-REFERENCE TO RELATED APPLICATIONS

The present application is a continuation-in-part of application Ser. No. 588,329, filed Oct. 21, 1966, entitled "Animal Feed, Conditioner and Process," which is abandoned in favor of the present application.

BACKGROUND OF THE INVENTION

It has long been thought desirable to feed whole grain to livestock, poultry and the like but this has not always been feasible due to the difficulties in maintaining sufficient moisture in the grain to make it sufficiently palatable and to insure that the nutrients contained therein are effectively assimulated by the animals. If the grains have been sufficiently hydrated for effective feeding, they cannot be stored for any prolonged period because of molding and deterioration. Thus, in order to permit prolonged storage, such grains have been dehydrated to a relatively low moisture level which appreciably lowers their nutritional value. Such dehydrated grain cannot be hydrated easily so other mechanical methods of processing the grains have been developed in order to open the grain for exposure of the endosperm or starch area to the digestive processes of monogastric and diagastric animals. Such mechanical methods of processing included grinding, crimping, cracking, rolling, flaking, popping, and the like, which, however, were not fully successful prior to the present invention because of the unpalatability of the processed grain which was mainly due again to the lack of moisture, excessive fines produced, and because of the substantial grain loss during such mechanical processing.

Accordingly, in the animal feed industry, it has been a common practice to mechanically process grains such as barley, oats, corn, maize, wheat, milo and others, prior to incorporating the same into feed formulae. A primary reason of such rolling or semiflaking is to enhance utilization of the nutrients in the endosperm or starchy hearts of the grain. Preferably, such rolling or semiflaking should produce a very thin flake having cohesiveness, and flake integrity or hardness, to withstand handling, and additionally to provide a light bulk density to secure the maximum nutrients from the grains while exposed to the digestive process of animals particularly in ruminants, such as in cattle and sheep.

In preparation of animal feeds from various types of grains as heretofore set forth, difficulties have existed in the past when rolling or semiflaking the grains in attempting to achieve as thin a flake as possible, in that the grain tended to powder when rolled. This is particularly true of hard grains, such as for example milo and hard barley.

Attempts have been made to overcome these difficulties and problems, and to obtain an edible product of enhanced nutrient characteristics, and animal appeal, by cooking the grains under high temperature and pressure conditions over substantially protracted time intervals. Pressure cooking equipment of a suitable nature has recently included several new types and designs capable of preparing grains for the rolling operations. The initial acquisition, installation and operation of such equipment, however, entails considerable expenses and in operation sometimes results in unfavorable production rates.

The high pressures utilized in these previous processes, in conjunction with the elevated temperatures, were required in order to obtain moisture penetration into the endosperm. The elevated temperature was required in order to obtain a chemical action benefit to accelerate starch gelatinization, and provide grain ductility and flake cohesiveness. Such processes, however, have not been entirely satisfactory and have proved expensive.

SUMMARY OF THE INVENTION

The present invention was initially practiced utilizing an aqueous solution of lignosulfonate, acid and a wetting agent as a pretreatment for whole grain, subsequent to which the grain was flaked by rolling. Such pretreatment was found to facilitate such rolling, to result in superior flaking characteristics, to cause accelerated starch gelatinization, to obtain superior digestibility, and to achieve improved nutrient utilization as an animal feed. However, these and other advantages, to which reference is made, were not limited to rolling or other physical modifications such as grinding, crimping, cracking, cutting, popping, cubing or the like. Even the treatment of whole grain for utilization by diagastric or monogastric animals, including humans, without physical treatment, achieved a breaking down of the waxy coating of the grain, more rapid moisture penetration, accelerated starch gelatinization, improved digestibility, superior nutrient utilization and a markedly superior food product. Similar advantages have been achieved by utilizing such solutions in the treatment of forage crops, as will be more particularly set forth.

Accordingly, it is an object of the present invention to provide an improved method of treating grains, seeds, forage crops and the like which enhances the nutrient value and handling characteristics thereof.

Another object is to provide such a method which renders the grain and forage crops more readily digestible and achieves improved nutrient utilization without subsequent heating or mechanical processing prior to feeding.

Another object is to provide an improved method of treating grains, seeds and the like which is effective to break down the waxy coating thereof to facilitate the penetration of moisture through the somewhat impervious hull and into the endosperm or starch area of the grains or seeds.

Another object is to provide an improved method of treating grain, seeds and forage crops which are to be employed as animal feeds to increase their nutritional value and their assimulative efficiency.

Another object is to provide an improved method of treating grains, seeds and forage crops to facilitate the subsequent mechanical processing thereof.

Another object is to render whole grains and seeds suitable for use as animal feeds and feed supplements without grinding, crimping, cracking, rolling, flaking, popping, comminuting, or other physical disruption.

Another object is to provide an improved method of treating whole grains, seeds and the like so as to permit the production of very thin flakes in a standard steam cooker without utilizing high pressures.

Another object is to provide an improved method of treating whole grains, seeds and the like which is adapted to create a feed product containing chemical components which improve the flaking characteristics of the grains when rolled for animal feed.

Another object of the invention is to provide an improved method of treating grains, seeds and the like which affords a simple and practical method of use and application of a modifier for improved roll flaking thereof.

An additional object is to provide an improved method of treating whole grains, seeds and the like which affords a practical and reasonable process for obtaining improved flaking characteristics of thinness, and improved digestibility in animal feeds, by the pretreatment of grains wherein the hull and endosperm are modified both physically and chemically by the addition of a liquid conditioner to permit a simple and economical tempering action which improves flaking by breaking down the waxy coating of the grain to allow more rapid moisture penetration into the grain endosperm to achieve accelerated starch gelatinization, ductility and flake cohesiveness.

A further object of the invention is to provide an improved method of treating whole grains, seeds and the like for feed utilization which results in appetite stimulation and improved nutrient utilization of the end product.

An additional object is to provide an improved liquid chemical conditioner suitable for use in the treatment of grains, seeds and forage crops to reduce fines and dust, and improve cubing and other physical conditioning thereof.

A further object is to provide an improved method of treating whole grains, seeds and the like for preconditioning the grain prior to rolling operations to flake the grain resulting in a substantial reduction of power required as compared with presently used grain rolling techniques and operations.

An additional object of the invention is to provide an improved method and material for treating grains, seeds and the like which are simple, inexpensive, susceptible to utilization with inexpensive equipment, and capable of substantially reducing the treatment time required prior to rolling or other physical treatment of the grain, seeds or the like.

Still further objects and advantages of the present invention will be more readily apparent from the following detailed description of preferred embodiments thereof which, however, are merely illustrative and are not to be considered as limitations upon the invention.

DESCRIPTION OF THE PREFERRED EMBODIMENT

As utilized herein, the term "grain" is intended to mean and include the seeds or seedlike fruits of the cereal grasses, such as wheat, barley, maize, oats, rice, millet, and the like, as well as the grains, seeds or ovules of plants normally used for sowing but having utility as animal feed. "Animal feed" is intended to mean feed for diagastric as well as monogastric animals, including humans.

In practicing the invention, the grain or forage is pretreated with a liquid conditioner which is diluted and applied, such as by spraying, on the grain in an aqueous solution. Thereafter, the so pretreated grains or forage can either be fed in whole form to animals without further processing, subjected to a cooking process by means of heat, in the nature of steam, or pretreated cold without the application of heat. The latter may include rolling, grinding, crimping, cracking, flaking, popping and the like to result in a more cohesive flake or other particle, minimum powdering, and improved digestibility characteristics.

It has been found when practicing the present invention that the hull and endosperm of grains are modified both physically and chemically by the addition of acidic aqueous solutions containing lignosulfonate, for example ammonium, sodium and calcium lignosulfonates and a wetting agent, which has surface tension reducing properties. Further, desired flaking characteristics of thinness and improved digestibility can be obtained both practically and reasonably by pretreating the grains before rolling or other physical treatment.

It has also been found by test that the action of the sulfonates can be further enhanced by the addition of varying quantities of alkyl-aryl sulfonates, ethylene oxide condensates and combinations thereof, plus acids such as phosphoric, hydrochloric, sulfuric, citric, acetic, butyric or other suitable acids including levulinic, gluconic, lactic, propionic or combinations thereof. Phosphoric acid has been found to be very desirable for use in that it in itself contributes needed phosphorus to the feed and is economically feasible. In most instances, it is preferred. If propionic acid is used it aids in mold prevention and appears to have a catalytic effect. The various other acids, however, are usable within the teachings of the invention.

If desired, the solution can include small percentages of anise flavor which imparts a desirable aroma frequently attractive to animals, and which also aids in covering undesirable odors and results in a more uniform scent.

As will be fully appreciated from the description of the ingredients utilized, a wide range of formulations may be employed. By way of examples, they are typified, as follows:

| Percent | Formulation examples | | | | | |
| --- | --- | --- | --- | --- | --- | --- |
| | I | II | III | IV | V | VI |
| Ammonium lignosulfonate | 25 | 25 | 25.0 | 35.0 | 50.0 | 10.0 |
| Phosphoric acid 75% (liquid) | 10 | 10 | 10.0 | 15.0 | 20.0 | 4.0 |
| Santomerse 1B | 1 | 2 | | | | |
| Triton DN 65 (liquid) | 1 | | .8 | 1.2 | 1.5 | .3 |
| Water | 63 | 63 | 64.2 | 48.8 | 28.5 | 85.7 |
| Total | 100 | 100 | 100.0 | 100.0 | 100.0 | 100.0 |

| | VII | VIII | IX | X | XI | XII |
| --- | --- | --- | --- | --- | --- | --- |
| Sodium lignosulfonate | 25 | 25 | 25 | 35 | 50 | 10 |
| Phosphoric acid | 10 | 10 | 10 | 15 | 20 | 4 |
| Polyoxypropylene-polyoxyethylene glycol (Pluronic L-64) | 2 | 1 | | 3 | | 1 |
| Methyl acetic acid | 1 | 3 | 1 | 1 | | |
| Triton DN-65 | | 1 | 2 | 1 | 2 | |
| Water | 62 | 60 | 62 | 45 | 28 | 85 |
| Total | 100 | 100 | 100 | 100 | 100 | 100 |

| | XIII | XIV | XV | XVI | XVII | XVIII |
| --- | --- | --- | --- | --- | --- | --- |
| Calcium lignosulfonate | 25 | 25 | 25 | 35 | 50 | 10 |
| Propionic acid | 10 | 10 | 10 | 15 | 20 | 4 |
| Alkyl-aryl sulfonate | 3 | 4 | 1 | 1 | 1 | 1 |
| Water | 62 | 61 | 64 | 49 | 29 | 85 |
| Total | 100 | 100 | 100 | 100 | 100 | 10 |

NOTE.—Anise, molasses or any suitable flavor may be added, if desired.

Anise, molasses or any suitable flavor may be added, if desired.

A satisfactory ammonium lignosulfonate is available from Crown Zellerbach Corp. A satisfactory phosphoric acid 75 percent food grade is available from FMC Corp. Santomerse 1B is a sodium alkyl-aryl sulfonate marketed by Monsanto Co. and Triton DN-65 is a modified ethoxylated straight chain alcohol marketed by Rohm & Haas Co. Other surfactants or wetting agents can be used in the grain modifier formulation. For example, Triton X-114, an octyl phenoxy polyethoxy ethanol and Triton X-100, an octyl phenoxy ethanol both marketed by Rohm & Haas Co. can be used. Also Calsoft F-90, a sodium alkyl-aryl sulfonate and Calsoft LAS-99, a dodecylbenzene sulfonic acid, both marketed by Pilot Chemical Co. are considered useful in practicing the invention. As further noted above, Pluronic L-64, a polyoxypropylene-polyoxytheylene glycol, can be employed.

While the foregoing formulations can be used in practicing the invention it is not intended to limit the stated proportions of chemicals to the listed percentages as both the concentration and combinations may be varied considerably and beneficial results attained. Obviously, the amount of treating solution used must be greater if a weaker solution is used otherwise the action will be slower or not as effective and conversely stronger solutions can be used in smaller amounts.

The solutions of the present invention may be applied to various grains and forage crops in various manners, as follows:

EXAMPLE NO. 1

Whole corn was treated by spraying with from 1 to 1½ quarts of the grain modifier solution of Formulation II above per ton of corn, at room temperature. The resultant treated corn was fed whole to cattle in a feed lot at Brighton, Colorado. Identical whole corn untreated was fed to corresponding cattle in the same feed lot. The cattle fed the treated whole corn gained weight more rapidly than the corresponding cattle and upon butchering had a higher percentage of choice grade meat.

EXAMPLE NO. 2

A mixture of 50 percent whole barley and 50 percent whole milo was treated with approximately 1 quart per ton of the grain modifier solution of Formulation II above at ambient temperature and fed whole without further processing to cattle. As a control, 50 percent whole barley and 50 percent whole milo were flaked by steam rolling in the conventional manner and fed to similar cattle. The cattle fed the treated mixture of whole barley and whole milo gained weight as rapidly as those fed the flaked barley and milo and in some instances more rapidly. The treated mixture was, of course, much more economical to supply.

EXAMPLE NO. 3

A mixture of 75 percent barley and 25 percent whole wheat was treated with approximately 1 quart of grain modifier solution of Formulation II above for each ton of the mixture at ambient temperature and fed to cattle whole without further processing. As a control, a mixture of 75 percent whole barley and 25 percent whole wheat was flaked by steam rolling in the conventional manner and fed to similar cattle. The cattle fed the treated mixture gained in weight as rapidly as those fed the flaked mixture and in some instances more rapidly. The treated mixture was much more economical to supply.

EXAMPLE NO. 4

Milo grain was sprayed with 1 quart of the grain modifier solution of Formulation II above per ton of the grain in sufficient water to increase the moisture content of the grain by 2 or 3 percent. The milo was held overnight and cold rolled the following day. The resultant flakes were fed to 126 steers in Amarillo, Texas. Such steers had an average weight gain of 3.888 pounds per day for the first 30 days; 3.76 pounds per day for the first 60 days and 4.05 pounds per day for the first 90 days. In another test group, 142 steers were fed the same treated milo grain and had an average weight gain of 3.76 pounds per day for the first 60 days. Steers corresponding in initial weight and condition to those fed the treated milo were fed untreated dry rolled milo grain; in contrast, had an average weight gain per day over a 90-day period of from 2.6 to 2.9 pounds.

EXAMPLE NO. 5

In Channing, Texas, 1 quart of the grain modifier solution of Formulation No. II above was applied to each ton of corn with sufficient water to increase the moisture content of the corn 5 percent. The treated corn was held for 12 hours and cold rolled the following day to flake it. The treated corn was fed to 140 steers who had a resultant average weight gain per day of 3.48 pounds. A corresponding group of 127 steers of the same initial weight and condition was fed untreated dry rolled corn and achieved an average weight gain per day of 2.9 pounds.

EXAMPLE NO. 6

An independent laboratory conducted a test to determine the efficacy of the grain modifier solution of the present invention when applied to grains. The test involved the measurement in solution by a refractometer of the conversion of available starches to maltose. Whole untreated corn was used as a standard to represent 100 percent. It showed 64 milligrams of refractometric solids per gram of solids. Rolled corn flaked by conventional process but untreated with the modifier solution of the present invention showed 88 milligrams refractometric solids per gram solids or 137.5 percent conversion. The same type of corn to which the grain modifier solution was applied in a ratio of approximately 1 quart per ton and subsequently cold rolled showed 248 milligrams refractometric solids per gram sample or a conversion rate of available starches to maltose of 387.5 percent. Similar tests were conducted by the same laboratory with barley, milo, corn, and wheat with the following results.

| Lab. No. | Moisture | Description | Mg. refractometric solids/gram sample | Percent of control |
|---|---|---|---|---|
| K-3800 | 9.79 | Whole barley—control | 120 | 100 |
| K-3801 | 19.66 | Whole barley—4% treated | 168 | 140 |
| K-3802 | 27.13 | Whole barley—2% treated | 184 | 153.3 |
| K-3803 | 10.57 | Whole milo—control | 40 | 100 |
| K-3804 | 20.33 | Whole milo—4% treated | 48 | 120 |
| K-3805 | 27.64 | Whole milo—2% treated | 64 | 160 |
| K-3806 | 16.77 | Whole corn—control | 48 | 100 |
| K-3807 | 22.92 | Whole corn—4% treated | 80 | 166.7 |
| K-3808 | 29.73 | Whole corn—2% treated | 80 | 166.7 |
| K-3809 | 9.96 | Whole wheat—control | 144 | 100 |
| K-3810 | 20.71 | Whole wheat—4% treated | 192 | 133.3 |
| K-3811 | 28.78 | Whole wheat—2% treated | 208 | 144.4 |

In the foregoing table "Treated" means that the grain was treated with the grain modifier solution of the present invention in an amount by weight of the percentage given.

EXAMPLE NO. 7

In further laboratory tests conducted on monogastric animals, such as rats and poultry, it was found that the preparation of cereal grains for human consumption in accordance with the present invention would apparently attain similar advantages. One-hundred and seventy, 28 day old Sprague Dawley male rats were alotted to treatment and fed 5 grams of a base diet supplemented with 10 percent (dry matter basis) of either milo, barley or corn as processed with 1, 2, and 4 quarts of the modifier solution of the present invention per ton of the grain. The rats were fed for 2 weeks and body weight gain and feed consumption recorded for each week. Twenty rats were fed a base control diet with no supplement. Ten rats were each fed the base control diet with untreated corn. Ten rats were fed the base control diet with supplemental corn treated with 1 quart of the modifier solution per ton. Ten rats were fed the base control supplemented with corn treated with 2 quarts of the modifier solution per ton. Ten rats were fed the base control supplemented with corn treated with 4 quarts of modifier solution per ton. Similar tests were conducted with 10 rats for each supplement prepared with milo and barley. Further, 10 rats were fed the base diet treated with 1 quart per ton of the modifier solution. Ten rats were fed the base diet treated with 2 quarts of said solution. Ten rats were fed the base diet treated with 4 quarts of the solution per ton. In almost all instances, the rats given the supplemental feedings consumed more food and gained more body weight than the twenty rats on the base control diet. In most instances, when the supplement grain was treated with the modifier solution of the present invention, the gain in body weight was greater than that for the rats fed untreated grain as a supplement. None of the rats showed any abnormalities of the vital organs upon post mortem examination. The tests revealed a low and acceptable order of toxicity with increased nutrient value for the treated grains.

In a somewhat similar test, cracked milo grain, cooked milo grain, fine ground milo grain, and milo grain treated with the modifier solution of the present invention were fed to test lots of broiler chickens. The broilers fed on the solution-treated milo grain achieved a 0.5 percent greater body weight in 1 week than those fed cracked milo grain. Broilers fed the solution-treated milo grain achieved the same body weight as those fed the cooked milo grain but required 2.7 percent less food and thus achieved a better food efficiency. The broilers fed the solution-treated milo grain had a 4 percent greater body weight in 1 week than those fed ground milo grain but consumed 0.9 percent more feed. This gave the treated grain a 3.2 percent advantage in food efficiency. The treated milo grain involved in these tests was processed by adding 4 percent of the solution of Formulation II above to water and applying the resultant solution to the milo grain in an amount equal to 3.5 percent by weight of the grain treated. The grain was permitted to stand overnight and flaked before feeding.

EXAMPLE NO. 8

A further feed lot test consisted of the treatment of milo grain with 1 quart of the aforementioned grain modifier per ton of grain in sufficient water to increase the moisture content of the grain from 2 to 3 percent. The treated grain was held overnight and cold rolled the following day. The resulting flakes were fed to cattle over a 90-day period. A test lot of similar cattle was fed untreated dry rolled milo grain over the same period. The cattle fed on the untreated grain averaged a daily weight gain of 3 pounds. The cattle fed with the grain treated with the aforementioned grain modifier had an average gain per day of over 4 pounds. Other feed lot tests involving the addition of 1 quart of the aforementioned grain modifier per ton of grain in sufficient water to increase the moisture content of the grain to 5 percent were conducted with substantially the same results.

EXAMPLE NO. 9

The aforementioned grain modifier solutions were mixed with water in the ratio of 5 oz. of modifier solution to 1-½ gallons of water (2.6 percent solution) and intermixed with dry barley at the rate of 20 gallons per ton. The barley was preheated by steam injection to 200°–220° F. and rolled for flaking purposes. As compared with untreated barley, the treated barley required 9 percent less power for flaking with all conditions of rolling otherwise the same. The reduction in power consumption is an indication of the changed character of the grain treated with grain modifier. There was also a flatter, more cohesive flake produced which, as previously stated, was of increased nutrient value.

EXAMPLE NO. 10

When regular grain (barley) was rolled on this roller settings a power consumption of 42 amperes load on the roller motor was noted. The addition of grain modifier solution of the present invention to the grain reduced the load to an average of 33 amperes, and the resultant flakes were thinner, slightly glazed, lighter in density and the hull had a tendency to separate from the endosperm leaving a flat somewhat adhesive flake. Also, the objectionable formation of powder was almost totally avoided.

EXAMPLE No. 11

Water used for spraying onto cut alfalfa for hay cubing has been treated with percentages of grain modifier solution of the present invention from 0.33 to 1 percent by weight, with improved cubing, minimized dust loss, increased production and improved nutrient value.

EXAMPLE No. 12

A typical grain treating process in accordance with the present invention as applied to the formation of flakes has proven highly satisfactory in improving flaking characteristics and accelerated starch gelatinization, grain ductility and flake cohesiveness. It consists of applying a treatment solution in accordance with any of the foregoing formulations in the amount of 1.5 quarts of treating solution diluted in 12 to 15 gallons of water per ton of grain. After application, the so treated grain is cooked at a temperature of between 180°–218° F. for a period of 5 to 15 minutes. It has been found that an optimum cooking time is in the neighborhood of 8 minutes. Subsequent to the cooking, the treated grain is then rolled in a standard roller mill with the roller setting being adjusted for flake thickness desired. Flake integrity or hardness to withstand handling is theoretically believed to be accomplished by surface welding of starch particles. It is to be noted that a standard steam cooker without high pressure is used in this process with consequent economies.

The modifier solution can be applied to the grain or forage by spraying thereon at a desired rate while conveyed and mixed in a screw conveyor. The resultant product can be utilized as feed without further treatment, can be held for periods of time before rolling, or can be hot or cold rolled right after application. The solution can also be mixed, with steam and water injectors or by pumps, into the grain prior to cooking operations or preheating for rolling. The treating solution can be sprayed or intermixed with dry forage such as hay or alfalfa prior to shredding, cubing or pelleting to aid nutrition and reduce dusting and fine losses.

The method of application and the point of application to the grain and forage can, of course, be varied in accordance with environmental and equipment convenience.

While the precise physical and chemical reactions which result from use of the present treating solution are not completely known, the nature thereof can be theorized by the results obtained. The treatment of grains of starch character by an acidic solution at high temperatures can be expected partially to dextrinize raw starch as indicated by the gelatinous appearance of hot flakes which cool to a slick cohesive surface. The sulfonates produce low surface tensions and improved moisture absorption. The lignosulfonate and acid have a dissolving effect on the hull components. The acid content aids in making calcium phytate in the grain more readily available for consumption by an animal when eating grain pretreated in accordance with the present invention and thereafter rolled. The combinations of materials allow better permeation of the fluid through the cellulose of the grain hulls and into the endosperm.

The above discussed feed lot testing has further demonstrated that low moisture whole grains can be treated with the grain modifier solution of the present invention to a substantially higher moisture level and held in storage for 24 to 48 hours for complete chemical action on the grain. The grain can then be fed in whole form to cattle which, as shown, has resulted in greater feed efficiency equal to or better than the thinner flaked grain processed in the standard steam rollers. Such use of the improved grain modifier solution of the present invention eliminates the use of steam and rolling equipment with grains such as corn, barley, wheat and milo and permits small farmers, ranchers and feed lot owners to obtain improved grain utilization without such expensive equipment. By the use of the improved method of the present invention, improved feed to weight gain ratios are obtained which results in substantially lower production costs.

The feeding of whole grains treated with the improved grain modifier solution of the present invention provides a completely new feeding approach which differs widely from the feeding of flaked or otherwise mechanically processed grains. The thin flakes of flaked grain are easily chewable by livestock, requiring less mastication and greater reliance upon the animal's rumenation and main stomach digestion processes, whether diagastric or monogastric. Previously, these thin flakes permitted more intimate or easy access of rumen microflora digestive enzymes to the starch area of the grain, thus making digestion a simple process with good assimilation of the grain by the animals. On the other hand, the feeding of high moisture whole grain, treated in accordance with the present invention, requires greater chewing or mastication which causes more saliva enzymes to work on the whole grain. The requirement of greater chewing by the animal replaces the previously required mechanical rolling process of the grain and increases saliva enzymes to assist the digestive process for greater feed efficiency.

It is believed the present combination of chemical components of the improved grain modifier solution of the present invention provides a combination of acidification, hydrolysis, sulfonation, phosphorylation, and enzymation which changes the water insoluble starch in the endosperm to a water soluble form for more complete assimilation, energy formation, and ultimately better weight gains per pound of grain fed for higher production with less cost.

Although the invention has been herein described in terms of particular ingredients, and ranges thereof to be used, and sets forth what is conceived to be the most practical and preferred method, it is obvious that many modifications and variations in the nature and proportions of the ingredients, and the steps of the process may be made without departing from the spirit and scope of the invention.

Having described our invention, what we claim as new and desire to secure by Letters Patent is:

1. A method of treating grain, forage and the like to improve the physical and chemical characteristics thereof as animal feed comprising applying thereto an acidic aqueous solution containing a lignosulfonate selected from the group consisting of ammonium lignosulfonate, sodium lignosulfonate, and calcium lignosulfonate; an acid; and a wetting agent "selected from the group consisting of alkyl-aryl sulfonates and ethylene oxide condensates".

2. The method of claim 1, wherein said lignosulfonate is present in approximately 10 to 50 percent by weight, the acid in approximately 4 to 20 percent by weight, said wetting agent in approximately 0.3 to 4 percent by weight, and water in approximately 28 to 85.7 percent by weight of said constituents; the solution being applied to the grain, forage or the like at a ratio of approximately 1 to 4 quarts per ton.

3. The method of claim 1 wherein the acid is selected from the group consisting of phosphoric, hydrochloric, sulfuric, citric, acetic, butyric, levulinic, gluconic, lactic and propionic acids.

4. The method of claim 1, wherein said acid consists of phosphoric acid 75 % food grade.

5. A treating and conditioning solution adapted for application to grain for facilitating mechanical processing into flakes and enhancing nutrient characteristics comprising an aqueous acidic solution of lignosulfonate selected from the group consisting of ammonium lignosulfonate, sodium lignosulfonate and calcium lignosulfonate; and a wetting agent "selected from the group consisting of alkyl-aryl sulfonates and ethylene oxide condensates".

6. The treating and conditioning solution of claim 5 including an acid.

7. The treating and conditioning solution of claim 9 wherein said lignosulfonate is present in approximately 10 to 50 percent by weight, the acid in approximately 4 to 20 percent by weight, said wetting agent in approximately 0.3 to 4 percent by weight, and water in approximately 28 to 85.7 percent by weight of said constituents.

8. A treating and conditioning solution as claimed in claim 6, wherein said acid consists of phosphoric acid 75 % food grade.

9. The solution of claim 6 in which the acid is selected from the group consisting of phosphoric, hydrochloric, sulfuric, citric, acetic, butyric, levulinic, gluconic, lactic and propionic acids.

10. An improved animal feed comprising grain having reacted therewith an aqueous acidic solution of a lignosulfonate selected from the group consisting of ammonium lignosulfonate, sodium lignosulfonate and calcium lignosulfonate; and a wetting agent "selected from the group consisting of alkyl-aryl sulfonates and ethylene oxide condensates"; and containing the reaction products of the starch of the grain with said lignosulfonate.

11. An improved animal feed comprising grain having reacted therewith an aqueous solution of an acid selected from the group of phosphoric, hydrochloric, sulfuric, citric, acetic, butyric, levulinic, gluconic, lactic and propionic acids; a lignosulfonate selected from the group consisting of ammonium lignosulfonate, sodium lignosulfonate and calcium lignosulfonate; and a wetting agent selected from the group consisting of alkyl-aryl sulfonates and ethylene oxide condensates, the starch of the grain being gelatinized by said reaction.

12. The animal feed of claim 10 in flake form.

13. A process of treating grain to improve physical and chemical characteristics thereof comprising applying to the grain a water solution containing a lignosulfonate selected from the group consisting of ammonium lignosulfonate, sodium lignosulfonate and calcium lignosulfonate, an acid, and a wetting agent "selected from the group consisting of alkyl-aryl sulfonates and ethylene oxide condensates", and rolling said grain after treatment with the solution to flake the same, and wherein flaking and nutrient availability characteristics are enhanced by the solution pretreatment.

14. A process as claimed in claim 13, wherein the grain after pretreatment with the solution is cooked at a temperature of between approximately 180°–218° F. for a period of approximately between 5 and 15 minutes.

15. A process as claimed in claim 13, wherein said lignosulfonate is present in the pretreating solution in approximately 10 to 50 percent by weight, said acid between approximately 4 and 20 percent by weight, said wetting agent between approximately 0.3 and 4 percent by weight, and water between approximately 28 and 85.7 percent by weight of said constituents.

16. A process as claimed in claim 13, wherein said acid consists of phosphoric acid 75 percent food grade 17. A pretreating and conditioning solution adapted for application to grain to facilitate rolling it into flakes and to enhance the nutrient characteristics thereof comprising an aqueous solution containing a lignosulfonate, an acid and a wetting agent; wherein said lignosulfonate is selected from the group consisting of ammonium lignosulfonate, sodium lignosulfonate and calcium lignosulfonate; said wetting agent is selected from the group consisting of alkyl-aryl sulfonates and ethylene oxide condensates; and said lignosulfonate is present in approximately 10 to 50 percent by weight, said acid between approximately 4 and 20 percent by weight, said wetting agent between approximately 0.3 and 4 percent by weight, and water between approximately 28 and 85.7 percent by weight of said constituents.

18. A pretreatment and conditioning solution as claimed in claim 17, wherein said acid consists of phosphoric acid 75 % food grade.

19. A process of treating grain to improve the physical and chemical characteristics thereof as an animal feed comprising the steps of applying to the grain an aqueous solution containing lignosulfonate selected from the group consisting of ammonium lignosulfonate, sodium lignosulfonate and calcium lignosulfonate, an acid and a wetting agent "selected from the group consisting of alkyl-aryl sulfonates and ethylene oxide condensates" to gelatinize the starch of the grain, and mechanically processing the grain after treatment with the solution further to expose and to render more accessible nutrients within the grain.

20. An animal feed consisting of a grain prepared by treating the grain with an aqueous solution containing lignosulfonate selected from the group consisting of ammonium lignosulfonate, sodium lignosulfonate and calcium lignosulfonate in a proportion of between approximately 10 and 50 percent by weight, an acid, consisting of phosphoric acid 75 % food grade, in a proportion of between 4 and 20 percent by weight, a wetting agent "selected from the group consisting of alkyl-aryl sulfonates and ethylene oxide condensates" in a proportion of between 0.3 and 4 percent by weight, and water in a proportion of between 28 and 85.7 percent by weight of said constituents; cooking the thus treated grain at a temperature of between approximately 180° and 218° F. for a period of approximately between 5 and 15 minutes; and rolling said grain to flake the same.

21. The method of claim 1 as applied to grain in which the solution is reacted with the starch of the grain in the presence of the sulfonates supplied by the lignosulfonate to gelatinize the starch.

* * * * *